Patented May 17, 1949

2,470,171

UNITED STATES PATENT OFFICE 2,470,171

POLYMERIZATION OF OLEFINS

Robert M. Kennedy, Drexel Hill, and Stanford J. Hetzel, Cheltenham, Pa., assignors to Sun Oil Company, Philadelphia, Pa., a corporation of New Jersey No Drawing. Original application October 30, 1945, Serial No. 625,694. Divided and this application April 17, 1947, Serial No. 742,194

6 Claims. (Cl. 260—683.15)

This invention relates to the polymerization of normally gaseous hydrocarbons, particularly hydrocarbons having three or more carbon atoms and at least one double bond or olefinic linkage per molecule, employing a novel solid catalyst permitting the use of advantageous operating conditions, for example, materially lower pressures.

This application is a division of Serial No. 625,694, filed October 30, 1945. According to the invention normally gaseous olefins, particularly hydrocarbons having three or more carbon atoms and at least one double bond or olefinic linkage per molecule are polymerized under conditions hereinafter described in presence of a solid polymerization catalyst comprising essentially silica gel, alumina and nickel.

In one embodiment the present invention comprises a process for the polymerization of the normally gaseous olefins comprising propylene and butylenes present in hydrocarbon gases, resulting from cracking or other refinery operations, for the production of compounds, suitable for further processing into a fuel for an internal combustion or other engine, by subjecting said olefin hydrocarbons to polymerization conditions of time, temperature and pressure hereinafter described in presence of a polymerization catalyst comprising essentially silica gel, alumina and nickel.

In a further embodiment the process of the present invention can be employed to effect the polymerization of other olefins, such as mono-olefins of higher molecular weight etc., in the presence or absence of propylene and butylenes or other hydrocarbon gases.

According to the invention the catalyst employed is prepared by impregnating silica gel particles, of size desired, with a water or other solution of aluminum and nickel salts. In one method of preparation solutions of aluminum and nickel nitrates of desired concentrations were added to a known quantity of silica gel, of desired particle size, in an evaporating dish. The mixture was evaporated to dryness, with stirring, and then ignited for about eight to ten hours or until the salts were completely decomposed. This was followed by reduction with hydrogen at elevated temperature.

According to the invention the catalyst composition is, by weight 80%–99.98% silica gel, 0.01%–10% alumina and 0.01%–10% nickel. Good results have been obtained with catalyst composition 90%–99% silica gel, ½%–5% alumina and ½%–5% nickel. A catalyst having a composition of about 96% silica gel, about 2% alumina and about 2% nickel has been employed as will appear hereinafter.

A catalyst having an approximate composition of 98% silica gel, 1% alumina and 1% nickel was prepared by adding one liter of an aqueous solution containing 97 grams of nickel nitrate, $Ni(NO_3)_2.6H_2O$, and 75 grams of aluminum nitrate, $Al(NO_3)_3.9H_2O$, to 2 kilograms of silica gel in an evaporating dish. The mixture was evaporated to dryness, with stirring, and then ignited for about nine hours to convert the nitrates to their respective oxides. Prior to use the catalyst mass was charged into a catalyst tube and ignited for one hour with air at 400° C. to ensure complete conversion to the oxides and to remove traces of water. It was then reduced with a slow stream of hydrogen for about nine hours at 400° C. to convert the nickel oxide to nickel.

While simultaneous impregnation with aluminum and nickel nitrate has been described it will be apparent to those versed in the catalyst art that other methods for preparation of the composition of the invention can be employed, although that described is presently preferred.

Also, for starting materials in the preparation of the catalyst composition any compound of aluminum, which upon ignition will yield alumina in activated form upon silica gel, and nickel salt, which will yield nickel oxide on ignition and which can be subsequently reduced to nickel on the silica gel can be employed, the essence of the invention insofar as it relates to the catalyst composition being in the specific combinations of materials as set forth.

For example, freshly precipitated aluminum hydroxide can be admixed with nickel hydroxide and added to silica gel and the whole ignited and then reduced as set forth previously. Or, if desired an aluminum compound and a nickel compound can be distributed on silica gel and the entire mass ignited in air followed by reduction of the ignited mass. As stated, other methods of preparation, apparent to those versed in the art can also be employed.

It is possible to substitute chromia for the alumina, and cobalt for the nickel in the catalyst composition.

It appears that advantageous results can be obtained when employing a composition containing less alumina than nickel. While the quantity of alumina should be substantially smaller than that of nickel it is absolutely necessary that an appreciable quantity of alumina be present.

The period of activity of the catalyst will naturally vary with circumstances of its use. In the polymerization of olefinic hydrocarbons, tests have shown that a practical conversion can be obtained for periods up to 5 hours without regeneration. The catalyst can be regenerated many times to substantially it original activity. After seventy-five regenerations, tests have shown that the activity was essentially unchanged.

In copending application Serial No. 625,692, filed October 30, 1945, by the instant inventors, there is described and claimed a catalyst composition consisting by weight of 80%–99.98% silica gel, 0.01%–10% alumina or chromia and 0.01%–10% nickel or cobalt.

Also, in copending application Serial No. 625,693, filed October 30, 1945, now Patent 2,452,190, by the instant inventors, there is described and claimed a process for the polymerization of a compound containing two or more carbon atoms and a double bond per molecule employing a catalyst consisting essentially of silica gel, alumina and nickel or cobalt.

In copending application Serial No. 625,694, filed by us October 30, 1945, upon which issued Patent No. 2,452,198, on October 26, 1948, there is described a process for polymerizing olefins utilizing silica gel, alumina and a metal selected from the group of nickel and cobalt, and there is also described but not claimed the subject matter claimed herein, namely, the utilization of silica gel, chromia and nickel or cobalt.

As stated, the process of the present invention is applicable to the polymerization of olefins such as propylene, the butylenes and other hydrocarbons.

According to the invention the hydrocarbon to be polymerized is contacted with the catalyst in suitable apparatus under conditions of contact time, temperature and pressure described hereinafter.

When polymerizing propylene and butylenes, or other gases, the charging rate, or time of contact, will preferably be such as to allow these gases to remain in contact with the catalyst for a time sufficient to cause the desired degree of conversion. Charging rates of 1 gram–12 grams gas/per minute/per 100 grams of catalyst have been employed. It is, however, within the scope of the invention to employ lower or higher charging rates with or without recycling of any incompletely reacted gases. For example, incompletely reacted or unreacted gases can be treated in subsequent zones wherein an identical catalyst is employed. Or, if desired, the composition of the catalyst may be different, but within the ranges claimed herein, in said zones.

The temperature employed for the polymerization of propylene and the butylenes will depend upon whether these gases are to be polymerized separately or in combination with each other in the presence or absence of other hydrocarbons. If substantially pure propylene is to be converted a temperature in the range of 300° C.–400° C., preferably about 325° C.–375° C., can be employed. If normal butylene is to be polymerized a temperature in the range of 250° C.–400° C., preferably 275° C.–325° C., can be employed. If isobutylene is to be separately polymerized a temperature within the range of 200° C.–400° C., preferably 250° C.–300° C., can be employed.

If the foregoing gases are to be polymerized together a temperature within the range of 200° C.–400° C., preferably 250° C.–350° C., can be employed.

It is to be understood that temperatures outside these ranges are not excluded from the scope of the invention.

The pressure employed for the polymerization of propylene and the butylenes will depend upon whether these are to be polymerized separately or in combination with each other in the presence or absence of other hydrocarbons. If substantially pure propylene is to be converted a pressure in the range 30 lbs./sq. in.–150 lbs./sq. in., preferably in the range 50 lbs./sq. in.–100 lbs./sq. in., can be employed. If normal butylene is to be polymerized a pressure in the range 30 lbs./sq. in.–250 lbs./sq. in., preferably in the range 60 lbs./sq. in.–150 lbs./sq. in., can be employed. If isobutylene is to be separately polymerized a pressure within the range 30 lbs./sq. in.–250 lbs./sq. in., preferably 60 lbs./sq. in.–100 lbs./sq. in., can be employed.

If the foregoing gases are to be polymerized together a pressure in the range 30 lbs./sq. in.–250 lbs./sq. in., preferably in the range 60 lbs./sq. in.–150 lbs./sq. in., can be employed.

It is to be understood that pressures outside the foregoing pressure ranges can be employed but these are not, at present, preferred. Pressures from about atmospheric pressure to about 1,000 lbs./sq. in. are not excluded from the scope of the invention.

The following table shows results obtained according to the invention.

| Catalyst Composition, Weight Per Cent | | | Gas Polymerized | Charging Rate [1] | Temp., °C. | Pressure, lbs./sq. in. | Yield, Weight Per Cent | | | | Unreacted, Wt. Per Cent Per Pass |
|---|---|---|---|---|---|---|---|---|---|---|---|
| | | | | | | | Dimer | | Trimer, etc. | | |
| Silica gel | Alumina | Nickel | | | | | single pass | recycle | single pass | recycle | |
| 94.5 | 1 | 4.5 | Propylene | .0250 | 400 | 60 | 9.0 | 16.4 | 6.7 | 12.2 | 55.0 |
| 94.5 | 1 | 4.5 | ----do---- | .0120 | 400 | 60 | 12.2 | 36.1 | 8.7 | 25.7 | 66.2 |
| 98 | 1 | 1 | Butene-2 | .0622 | 300 | 60 | 24.3 | 61.9 | 13.3 | 34.0 | 60.8 |
| 96 | 2 | 2 | ----do---- | .0510 | 300 | 60 | 14.5 | 63.3 | 7.4 | 32.2 | 77.1 |
| 90 | 5 | 5 | ----do---- | .0432 | 300 | 60 | 9.5 | 47.5 | 8.0 | 40.0 | 80.0 |
| 90 | 5 | 5 | Butene-1 | .0390 | 300 | 60 | 7.1 | 37.4 | 10.7 | 56.3 | 81.0 |
| 94.5 | 1.0 | 4.5 | Isobutene | .0370 | 300 | 60 | 21.8 | 50.2 | 14.5 | 33.3 | 56.5 |
| 98.0 | 1.0 | 1.0 | Butene-2 | .0828 | 300 | 250 | 35.0 | 81.5 | | | 57.0 |
| 94.5 | 1.0 | 4.5 | Isobutene | .1270 | 300 | 200 | 19.0 | 82.5 | | | 77.0 |

[1] Grams gas/min./gram catalyst.

A distinct advantage of the invention is that certain compounds not heretofore polymerizable to a substantial extent can be polymerized in good yield. For example, it has been found, unexpectedly, that alpha and beta butylenes in the absence of isobutylene can be substantially polymerized. The prior art yield has been due largely to the polymerization of isobutylene or to the polymerization of alpha and beta butylenes in the presence of isobutylenes.

The polymerization of the gases according to this invention can be effected employing recycling of any unreacted gases. A series of conversion or polymerization zones can be employed in series or in parallel. Each zone may be alternately used to polymerize gases or for the regeneration of the catalyst therein. The catalyst may be circulated through the polymerization zone, or zones, according to methods within the skill of those versed in the art.

Various modifications within the scope of the invention as defined herein and in the claims will be obvious to those skilled in the art.

We claim:

1. A process for the polymerization of olefins containing three or more carbon atoms per molecule which comprises contacting the olefins under polymerizing conditions with a catalyst consisting by weight of 80%–99.98% silica gel, 0.01%–10% chromia and 0.01%–10% of a metal selected from the group consisting of nickel and cobalt.

2. A process for the polymerization of propylene which comprises contacting propylene at a temperature within 300° C.–400° C. and at a pressure within 30 lbs./sq. in.–150 lbs./sq. in. with a catalyst consisting by weight of 80%–99.98% silica gel, 0.01–10% chromia and 0.01%–10% nickel.

3. A process for the polymerization of n-butylene which comprises contacting n-butylene at a temperature within 250° C.–400° C. and at a pressure within 30 lbs./sq. in.–250 lbs./sq. in. with a catalyst consisting by weight of 80%–99.98% silica gel, 0.01%–10% chromia and 0.01%–10% nickel.

4. A process for the polymerization of i-butylene which comprises contacting i-butylene at a temperature within 200° C.–400° C. and at a pressure within 30 lbs./sq. in.–250 lbs. /sq. in. with a catalyst consisting by weight of 80%–99.98% silica gel, 0.01%–10% chromia and 0.01%–10% nickel.

5. A process for the polymerization of olefins containing three or more carbon atoms per molecule which comprises contacting the olefins under polymerizing conditions with a catalyst consisting by weight of 80%–99.98% silica gel, 0.01%–10% chromia and 0.01%–10% of a metal selected from the group consisting of nickel and cobalt, said catalyst having been prepared by distributing on silica gel, a compound of chromium, which will yield the oxide on ignition, and a compound of the group consisting of nickel and cobalt, which will yield the oxide on ignition, igniting the mass and then reducing the ignited mass.

6. A process for the polymerization of olefins containing three and four carbon atoms per molecule which comprises contacting the olefins at a temperature within the range 200° C.–400° C. with a catalyst consisting by weight of 90%–99% silica gel, ½%–5% chromia and ½%–5% nickel, said catalyst having been prepared by adding chromium and nickel nitrates in aqueous solution to silica gel, evaporating and igniting the masses and then reducing the ignited mass.

ROBERT M. KENNEDY.
STANFORD J. HETZEL.

REFERENCES CITED

The following references are of record in the file of this patent:

UNITED STATES PATENTS

| Number | Name | Date |
|---|---|---|
| 2,332,276 | Stahly | Oct. 19, 1943 |
| 2,380,358 | Anderson et al. | July 10, 1945 |
| 2,381,198 | Bailey et al. | Aug. 7, 1945 |